US011183869B2

(12) United States Patent
Bush et al.

(10) Patent No.: US 11,183,869 B2
(45) Date of Patent: Nov. 23, 2021

(54) SYSTEM AND METHOD FOR GENERATOR FREQUENCY CONTROL DURING UPS POWER WALK-IN

(71) Applicant: Vertiv Corporation, Columbus, OH (US)

(72) Inventors: Terry D. Bush, Westerville, OH (US); Peter A. Panfil, Columbus, OH (US); Brian P. Heber, Delaware, OH (US)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 16/839,878

(22) Filed: Apr. 3, 2020

(65) Prior Publication Data
US 2020/0321800 A1   Oct. 8, 2020

Related U.S. Application Data

(60) Provisional application No. 62/829,711, filed on Apr. 5, 2019.

(51) Int. Cl.
*H02J 9/06*   (2006.01)

(52) U.S. Cl.
CPC .................... *H02J 9/062* (2013.01)

(58) Field of Classification Search
USPC .......................................................... 307/64
See application file for complete search history.

(56) References Cited

U.S. PATENT DOCUMENTS

| 6,020,657 A * | 2/2000 | Liran ............... H02J 9/066 307/64 |
| 6,201,319 B1 * | 3/2001 | Simonelli ......... H05K 7/1492 307/26 |
| 7,952,232 B2 | 5/2011 | Burra et al. |
| 8,670,872 B2 | 3/2014 | Rasmussen et al. |
| 9,077,208 B2 | 7/2015 | Bickel |
| 9,762,160 B2 | 9/2017 | Tesch |
| 10,069,331 B2 | 9/2018 | Pancheri et al. |

(Continued)

FOREIGN PATENT DOCUMENTS

WO   WO-2010092580 A1   8/2010

OTHER PUBLICATIONS

International Search Report and Written Opinion for corresponding International Application No. PCT/US2020/026685 dated Aug. 3, 2020.

(Continued)

*Primary Examiner* — Toan T Vu
*Assistant Examiner* — Xuan Ly
(74) *Attorney, Agent, or Firm* — Harness, Dickey & Pierce, P.L.C.

(57) ABSTRACT

The present disclosure relates to a system for controlling power walk-in for an uninterruptible power supply (UPS) being switched to receive AC power from an AC generator. The system may have a control system and a power walk-in (PWI) subsystem. The PWI subsystem may be controlled in part by the control system. The PWI subsystem may be configured to control at least one of an input current or an input power of an AC signal being provided by an AC generator during a power walk-in operation to attempt to maintain a minimum frequency of the AC signal from the AC generator during the power walk-in operation.

19 Claims, 4 Drawing Sheets

(56) References Cited

U.S. PATENT DOCUMENTS

2004/0084965 A1    5/2004  Welches et al.
2011/0264292 A1*  10/2011  Morishima ............. H02J 9/062
                                                            700/292
2017/0264101 A1    9/2017  Kolhatkar et al.

OTHER PUBLICATIONS

Hung, W. W., and G. W. A. McDowell. "Hybrid UPS for standby power systems." Power Engineering Journal 4.6 (1990): 281-291.

* cited by examiner

SYSTEM AND METHOD FOR GENERATOR FREQUENCY CONTROL DURING UPS POWER WALK-IN

CROSS REFERENCE TO RELATED APPLICATIONS

The present application claims priority to U.S. Provisional Application Ser. No. 62/829,711, filed Apr. 5, 2019, the entire disclosure of which is hereby incorporated by reference into the present application.

FIELD

The present disclosure relates to uninterruptible power supply systems, and more particularly to an uninterruptible power supply system having the capability to monitor a frequency of an AC input signal being received from an external power generator, and to modify one or more internal operational parameters while receiving AC power from the generator during a generator power walk-in process, which reduces or eliminates overloading and/or unstable operation of the generator during the power walk-in process.

BACKGROUND

This section provides background information related to the present disclosure which is not necessarily prior art.

Uninterruptible power supplies (UPSs) are used in many data center, business, health care and other environments to provide AC backup power to data center and infrastructure devices. When AC power is being received by the UPS from a mains power source or an AC generator, the internal batteries of the UPS typically do not need to be used to supply downstream devices with AC power.

An AC generator is often located at the site to provide AC power to an input of a UPS, to accommodate the event of a power outage. When such power is applied to the UPS input from a generator, typically a "power walk-in" process is followed by which AC power is gradually increased from the generator to the UPS's input. Power walk-in is typically achieved by monitoring and controlling generator current; however, power walk-in can also be based on monitoring and controlling power draw from the generator. In either case, power is increased in a manner such that the sudden application of power to the UPS's input port does not cause damage to the generator or the tripping of any internal breakers of the generator.

It is generally desirable to walk-in a generator as quickly as possible so that the battery of the UPS is unloaded as quickly as possible. This minimizes the battery discharge cycling and maximizes battery life. Historically, generator walk-in control has been done by pre-setting a walk-in time. This means that the generator will be walked in to full power in a fixed amount of time (i.e., a number of minutes/seconds). The frequency of the power output signal from the generator falls as the generator is loaded. Depending on UPS load, generator conditions, or other factors, a power walk-in process with a fixed walk-in time may cause the generator output frequency to drop below a minimum predetermined value for proper (stable) generator operation. This can seriously stress the internal components of the generator. Furthermore, it can result in the UPS suspending the power walk-in operation due to an out of tolerance frequency of the input power being received. If the power walk-in process is suspended or repeatedly interrupted, this condition may result in excessive UPS operation on its standby battery(ies).

One option for addressing the frequency drop problem during the power walk-in process is to manually adjust the UPS power walk-in rate or time in order to indirectly control the generator frequency. While controlling the power walk-in process manually is possible, it is susceptible to significant error. This is because manually controlling the power walk-in process relies on estimates made by an individual based on relative UPS load and generator rating, and such estimates often diverge sufficiently from the needed control parameters to fully eliminate the frequency drop during the power walk-in process.

Accordingly, it would be highly desirable for the UPS to be able to monitor the generator frequency and automatically adjust the power walk-in rate, in real time, in order to maintain a minimum generator frequency while simultaneously achieving a smooth or relatively constant walk-in rate in the shortest possible time interval.

SUMMARY

In one aspect the present disclosure relates to a system for controlling power walk-in for an uninterruptible power supply (UPS) being switched to receive AC power from an AC generator. The system may comprise a control system and a power walk-in (PWI) subsystem. The PWI subsystem may be controlled in part by the control system. The PWI subsystem may be configured to control at least one of an input current or an input power of an AC signal being provided by an AC generator during a power walk-in operation to attempt to maintain a minimum frequency of the AC signal from the AC generator during the power-walk-in operation.

In another aspect the present disclosure relates to an uninterruptible power supply (UPS) able to control a power walk-in operation when the UPS is being switched to receive AC power from an AC generator. The UPS may comprise a control system and a power walk-in (PWI) subsystem. The PWI subsystem may be controlled in part by the control system and configured to control at least one of an input current or an input power of an AC signal being provided by an AC generator during a power walk-in operation. The input current or the input power of the AC signal being provided may be controlled by the PWI subsystem to so that either: 1) the PWI subsystem attempts to maintain a minimum frequency of the AC signal from the AC generator during the power-walk-in operation, or 2) the power walk-in time occurs within a predetermined maximum power walk-in time period. The PWI subsystem may further include a user settable minimum generator frequency control for enabling a user to set a minimum value for the frequency of the AC signal from the AC generator, which the frequency of the AC signal is not to drop below while the power walk-in operation is being carried out.

In still another aspect the present disclosure relates to a method for controlling power walk-in for an uninterruptible power supply (UPS) being switched to receive AC power from an AC generator. The method may comprise setting a minimum frequency which a frequency of the AC signal from the AC generator is not to drop below. The method may further include controlling at least one of an input current or an input power of the AC signal being provided by the AC generator during a power walk-in operation to ensure that a minimum frequency of the AC signal from the AC generator is maintained during the power-walk-in operation.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings, in which.

DETAILED DESCRIPTION

Example embodiments will now be described more fully with reference to the accompanying drawings.

The present disclosure relates to uninterruptible power supply systems, and more particularly to embodiments for an uninterruptible power supply system, and methodologies for controlling such systems, which provide the capability to monitor a frequency of an AC input signal being received from an external power generator, and to modify one or more internal operational parameters while receiving AC power from the generator during a generator power walk-in process. The various embodiments and methodologies described herein reduce or substantially eliminate overloading and/or unstable operation of the generator during the power walk-in process.

Figure 1:
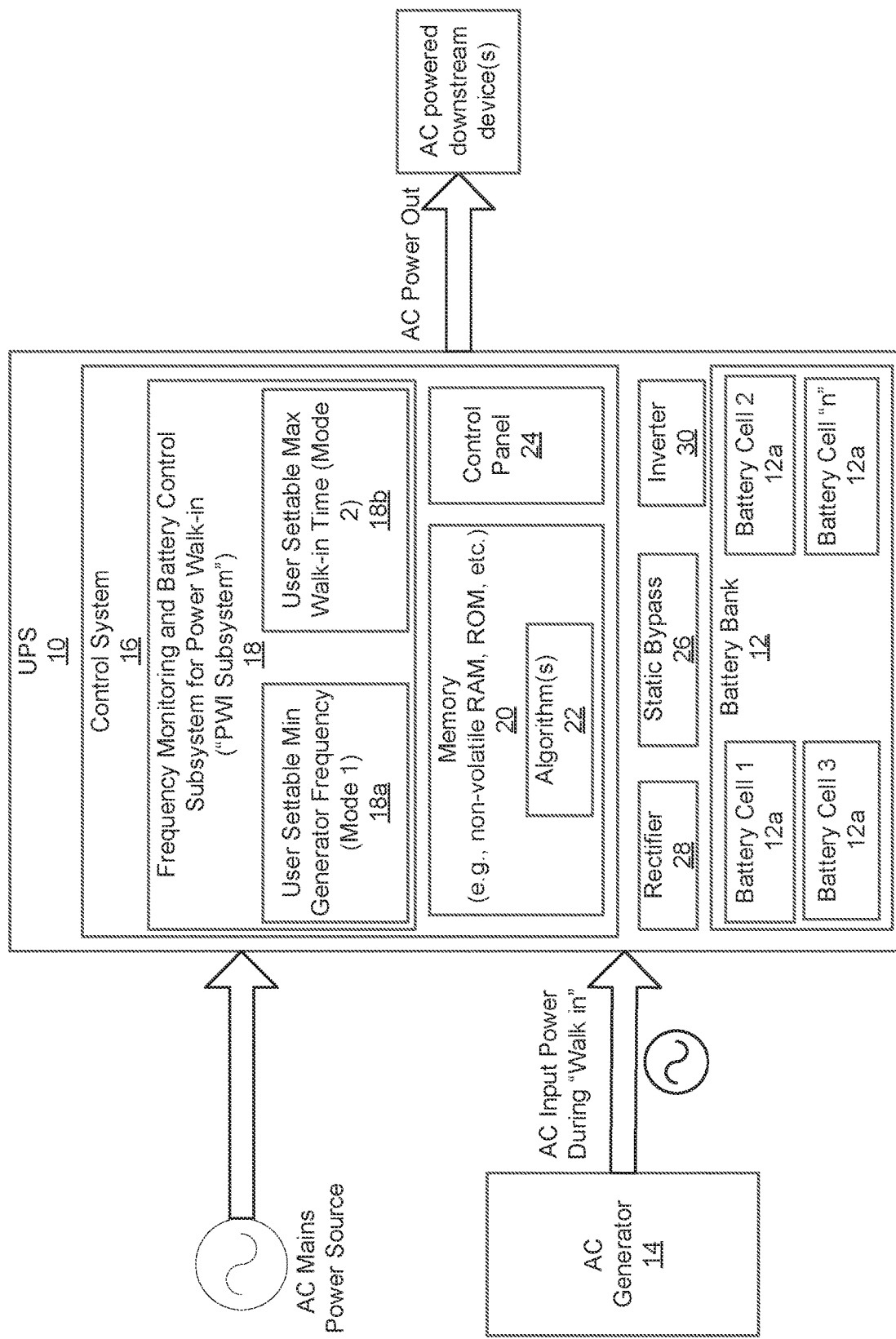
FIG. 1 is a high level block diagram illustrating an uninterruptible power supply (UPS) in accordance with one embodiment of the present disclosure, which is shown receiving AC power from an external AC generator.

Referring to FIG. 1, an uninterruptible power supply ("UPS") 10 is shown in accordance with one embodiment of the present disclosure. In normal operation the UPS 10 receives AC power from an AC Mains power source and an internal bypass circuit passes the AC power through the UPS 10 to downstream devices associated with the UPS. The received AC mains power may also be used to charge a battery bank 12 made up of one or more internal battery cells 12a. The UPS 10 may also be configured to receive power from an AC generator 14. When switching over to receiving power from the AC generator 14, the UPS 10 will carry out a power "walk-in" procedure. This operation will be described in detail in the following paragraphs.

The UPS 10 may also include a control system 16 having a frequency monitoring and battery control subsystem for power walk-in 18 (hereinafter simply "PWI subsystem" 18), and a memory 20, which may be a non-volatile memory (e.g., RAM, ROM, etc.) for storing one or more algorithms 22 used by the PWI subsystem 18 and possibly by other subsystems of the UPS 10. The PWI subsystem 18 may include a user settable control 18a for selecting a minimum generator frequency to be maintained during a power walk-in operation at the fastest possible walk-in time, which may be viewed as a "primary mode" of power walk-in control. By "walk-in time", it is meant the time period starting from the time at which the AC generator 14 becomes available to be used as the input power source for the UPS 10, until the time at which the AC generator 14 has assumed the entire UPS 10 load and the battery cells 12a are not being used to support the UPS 10 load. An additional user settable control 18b may be included for enabling a "secondary mode" of power walk-in control, where the user can set a maximum power walk-in time at the highest possible generator operating frequency. The primary mode may be the default mode. However, the user may select the secondary mode via a selection made from a control panel 24 of the UPS 10, and the primary mode may be re-selected from the control panel 24 if the secondary mode was previously set to be used. The UPS 10 may also include a static bypass subsystem 26, a rectifier 28, and an inverter 30, which are generally standard components for most modern day UPS systems.

A minimum acceptable generator operating frequency may be understood as a frequency that the user chooses based upon experience or other information (for example, including published generator data on power vs. frequency, frequency range of UPS, etc.) that will provide some relative assurance that the generator will not stall or become unstable or disqualified during the power walk-in process. Generators are designed to operate at their rated frequency (for example, 60 Hz). The lower the frequency goes below rated frequency, the less power the generator can provide and the more likely that the control may become unstable or even stall, but the exact value at which this may occur may not be expressly specified by the manufacturer.

In the primary mode the UPS 10 allows the user to set a desired minimum operating frequency, and the walk-in time may be automatically adjusted so that the AC generator 14 can be walked in as quickly as possible without letting the frequency fall below the minimum desired frequency. Alternatively, the user may consider that the walk-in time must be limited to some maximum time in order to reduce battery cycling or because a limited source of DC power (i.e., flywheel rather than battery) is being used. In that case, the walk-in must occur quickly before the DC source is exhausted. To ensure that walk-in occurs before the DC source is exhausted, the user can enable the secondary or maximum walk-in time mode, in which the minimum frequency set by the user will be automatically adjusted to a lower frequency to increase the walk-in rate until the desired maximum walk-in time is met. Even though the frequency may fall below the normal minimum desired frequency, it will not be lowered any more than necessary to meet the maximum walk-in time allowed (i.e., set) by the user.

Thus the secondary mode of operation walks in the AC generator 14 at the highest frequency possible while still meeting the maximum walk-in time. This does not mean that the generator is operated above the rated frequency, but rather it is operated no lower than necessary below the rated frequency.

It will be appreciated that when the maximum walk-in time is enabled, both modes of operation (primary and secondary) are active. As long as the AC generator 14 is walking in at a rate that will meet the maximum allowed walk-in time, the minimum generator frequency setpoint is unaltered and the AC generator is maintained at the normal minimum generator frequency setpoint. Only when the control logic exercised by the PWI subsystem 18 determines that the walk-in time will exceed the maximum time setpoint does it reduce the minimum generator frequency setpoint. Even after reducing the minimum generator frequency setpoint, the control logic implemented by the PWI subsystem 18 still controls frequency, but at the reduced setpoint rather than at the initial user-set setpoint. If the maximum walk-in time requirement is now being met, the minimum generator frequency setpoint will not be reduced further. It should be understood that the reduction in minimum generator frequency setpoint will likely be small, perhaps ½ hertz or less, unless the maximum walk-in time is set to some unreasonably short time. The "risk" associated with lowering the frequency slightly may be more than acceptable considering the importance of meeting the maximum walk-in time requirement before the DC source is exhausted.

Figure 2:
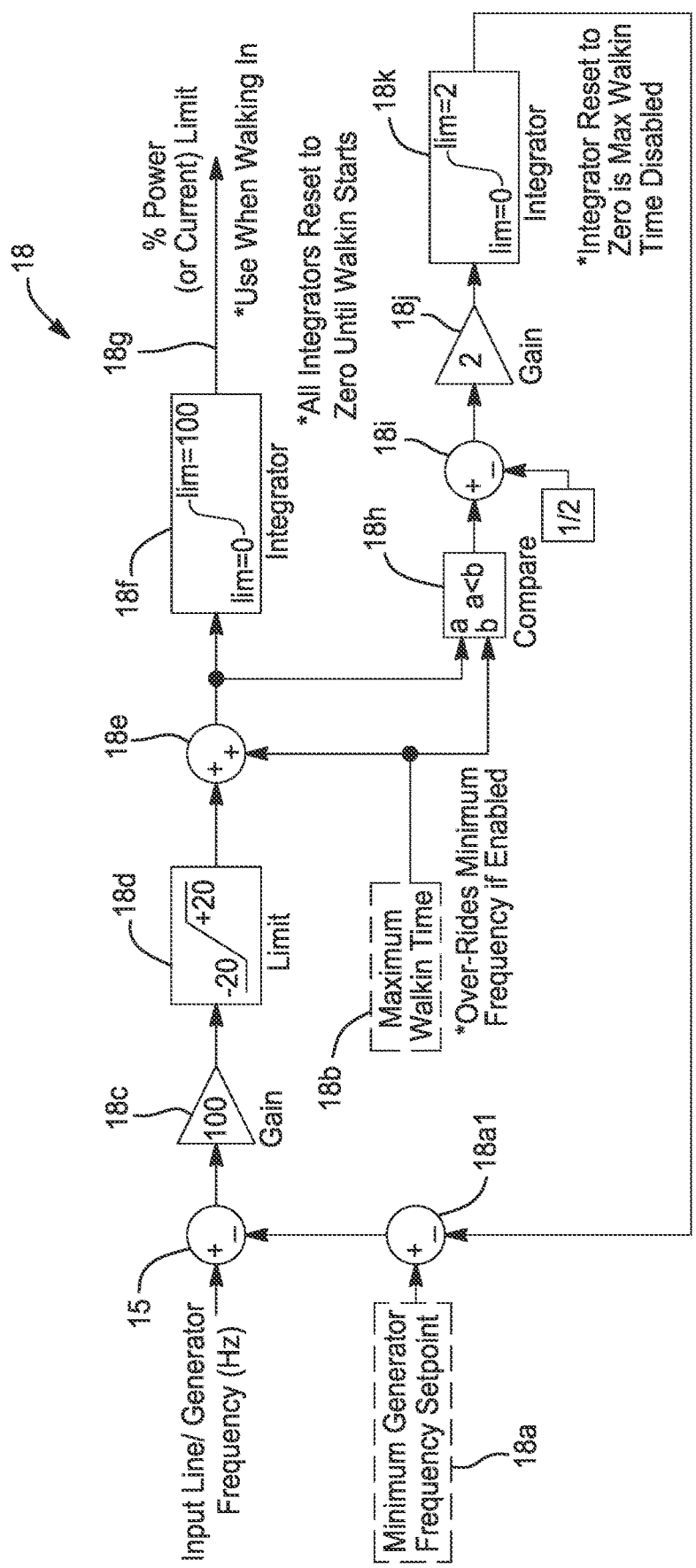
FIG. 2 is a high level schematic diagram of a power walk-in ("PWI") subsystem of the UPS of FIG. 1 which performs frequency monitoring and power adjustment for the UPS during a power walk-in procedure.

Referring briefly to FIG. 2, a high level system control diagram is shown illustrating various components of the control system 16 used to monitor frequency of the generator input signal during a power walk-in operation. During the operation of the control system 16, a difference 15 is determined between the generator frequency and the minimum generator frequency setpoint. If the AC generator 14 frequency is above the setpoint, the control system 16 increases the power walk-in rate through the action of gain 18c, limiter 18d, adder 18e and integrator 18f. Conversely, if the generator frequency is below the setpoint, the control system 16 decreases the power walk-in rate though the action of the same components 18c, 18d, 18e, and 18f. It should be understood that the frequency difference determination and subsequent adjustment of the walk-in rate is a continuous process, and as the frequency difference becomes smaller, the power walk-in rate adjustment also becomes smaller. Thus the control system 16 will cause the AC generator 14 frequency to quickly approach the desired frequency if there is a large frequency difference, and then will gradually adjust to the desired frequency as the frequency difference becomes smaller. In this way, the control system 16 will act to continuously control the power loading on the generator (i.e., walk-in) at the maximum rate possible while maintaining the generator frequency at the minimum frequency. It should also be understood that the control value at the input of 18f represents the walk-in time evaluated at the present generator frequency, and that by using the action of comparator 18h to compare this value to a possible maximum walk-in time 18b allowed, the controller may, if enabled to do so, reduce the minimum generator frequency setpoint through the action of offset adjustment 18i, gain 18j, integrator 18k and subtractor 18a1. The maximum walk-in time control mode process is also a continuous process, as described in the control of minimum frequency, and in effect lowers the minimum generator frequency setpoint to allow the control to adjust the walk-in time within the maximum walk-in time setpoint 18b. In other words, enabling the maximum walk-in time mode control does not disable the generator frequency control mode but simply lowers the minimum generator frequency setpoint to enable the control of walk-in time within the maximum time allowed.

Figure 3:
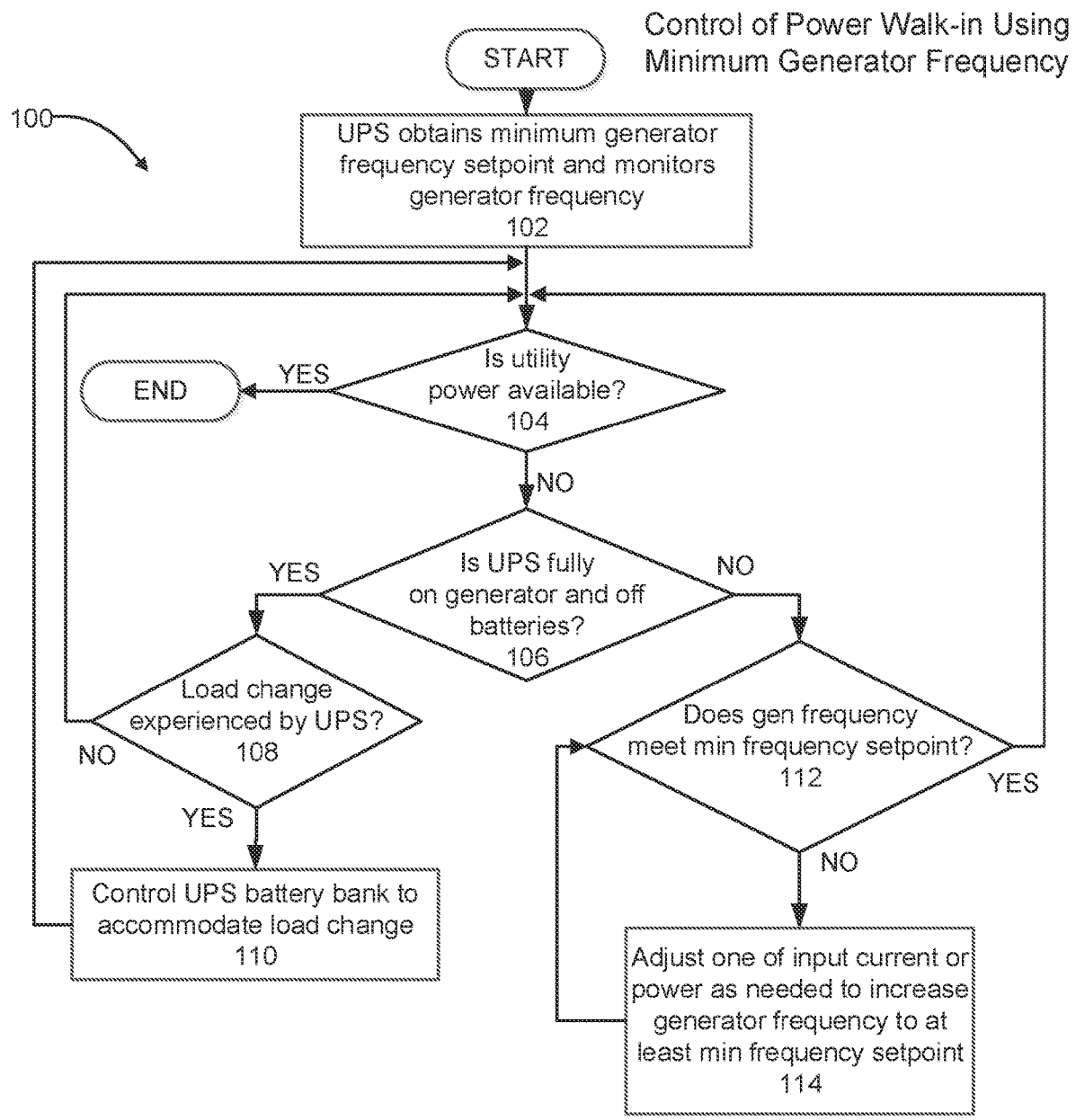
FIG. 3 is a high level flowchart showing various operations which may be performed by the UPS in controlling a power walk-in operation.

Referring now to FIG. 3, a flowchart 100 is shown setting forth one example of how the primary mode of controlling generator power walk-in is carried out. As noted above, the primary mode involves the user setting a minimum frequency that must be maintained for the AC signal being provided by the AC generator 14 during a power walk-in operation. The flowchart 100 assumes that the user has input the value of the minimum generator frequency setpoint via the user settable control 18a.

At operation 102 the PWI subsystem 18 of the UPS 10 obtains the minimum generator frequency setpoint and begins to monitor the frequency of the AC signal being received from the generator 14 as a power walk-in operation begins. At operation 104 the PWI subsystem performs a check to determine if utility power is available. If the check at operation 104 returns a "Yes" value, the power walk-in operation ends. If operation 104 returns a "No" value, the power walk-in operation proceeds. At operation 106, the PWI subsystem 18 checks to determine if the AC generator 14 has assumed the entire UPS load and the batteries 12a of the battery bank 12 are not being used to support any of the UPS load. If operation 106 returns a "No" answer, at operation 112 the PWI subsystem 18 makes an initial check if the frequency of the AC input signal from the AC generator 14 meets, or is on track to meet, the minimum generator frequency setpoint. If this check produces a "Yes" answer, then operation 104 is repeated. If the check at operation 112 produces a "No" answer, then at operation 114 the PWI subsystem 18 adjusts one of the input current or input power drawn from the generator, or possibly even both, to increase generator frequency. Operation 112 is then repeated in a process that continues until the generator frequency meets the minimum generator frequency setpoint.

If the check at operation 106 returns a "Yes" answer, meaning that the AC generator 14 has assumed the entire UPS load and that the batteries 12a of the battery bank 12 are not being used to support any of the UPS load, then the PWI subsystem 18 may carry out operation 108 to determine if a load change has been experienced by the UPS 10. The load change may be of a sufficient quantity to cause the generator frequency to drop below the minimum generator frequency setpoint; alternatively, the load change may be a small change that does not cause a change in generator frequency. If the check at operation 108 produces a "Yes" answer, then the UPS 10 control system 16 may control the battery bank 12 to supplement the AC power being provided by the AC generator to help accommodate the load change, as indicated at operation 110. Use of the UPS battery bank 12 will typically not be needed if a load is shed during the power walk-in operation. After operation 110 is performed, or if no load change is experienced and the answer at operation 108 is "No", then operation 104 may be repeated. Thus the PWI subsystem 18 continuously monitors generator frequency while the UPS 10 is running on generator.

Figure 4:
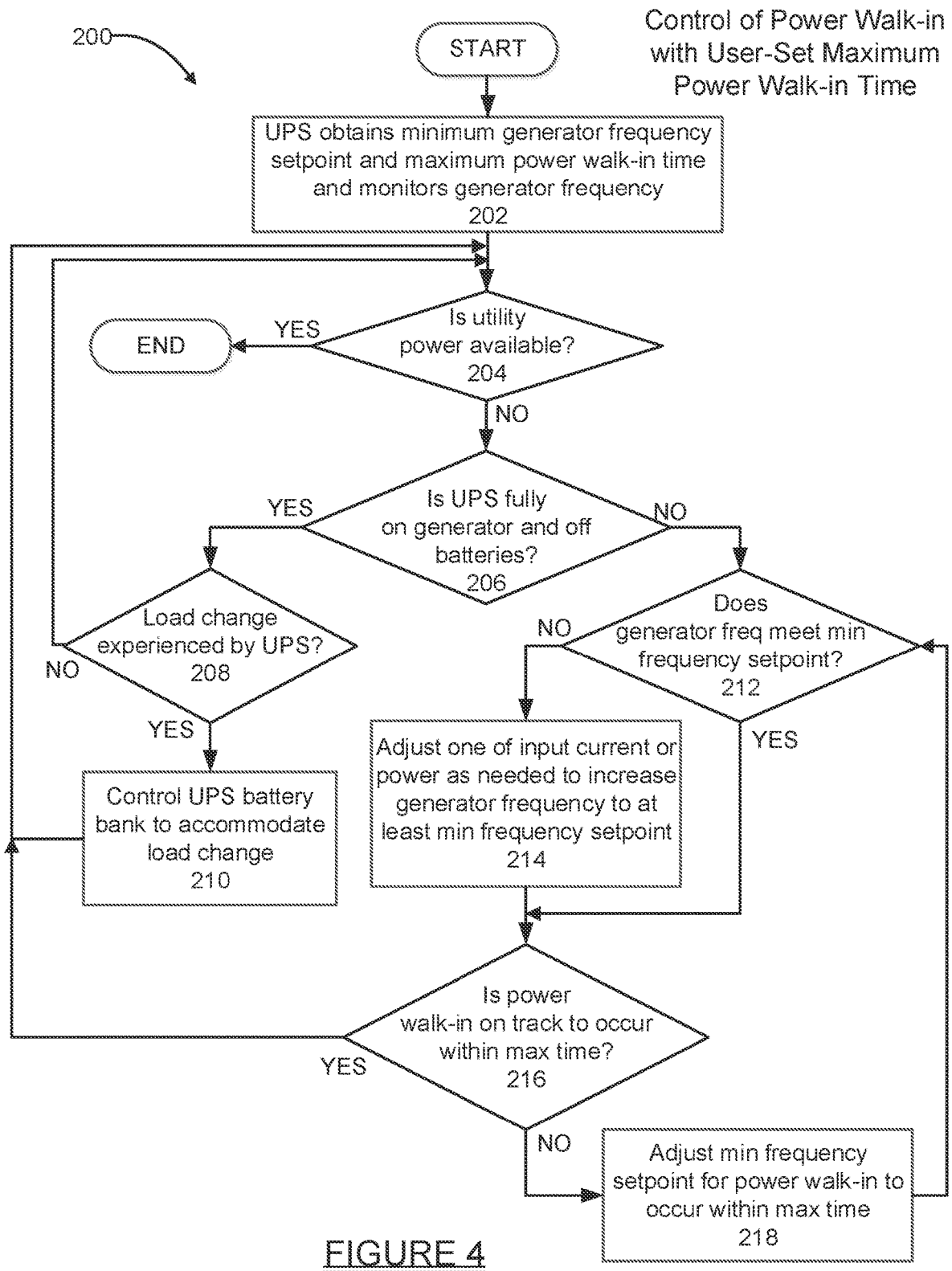
FIG. 4 is a high level flowchart showing various operations which may be performed by the UPS in controlling a power walk-in operation when a maximum power walk-in time has been designated by a user.

Referring now to FIG. 4, a flowchart 200 is shown setting forth one example of how the secondary mode of controlling generator power walk-in is carried out. As noted above, the secondary mode involves the user setting a maximum time limit for the AC generator 14 to assume the entire UPS 10 load, such that the battery cells 12a are not being used to support the UPS 10 load. At operation 202, as a power walk-in operation begins, the PWI subsystem 18 of the UPS 10 obtains the minimum generator frequency setpoint and user-set maximum power walk-in time, and monitors the frequency of the AC signal being received from the generator 14. It will be appreciated that operations 204, 206, 208, and 210 performed by the PWI subsystem 18 are equivalent to operations 104, 106, 108, and 110 performed by the PWI subsystem 18 in the primary mode, as described in the flowchart 100 of FIG. 3. At operation 212, the PWI subsystem 18 makes an initial check if the frequency of the AC input signal from the AC generator 14 meets the minimum generator frequency setpoint. If the check at operation 212 produces a "No" answer, meaning that the real time generator frequency has dropped below the minimum generator frequency setpoint, then at operation 214 the PWI subsystem 18 adjusts one of the input current or input power drawn from the generator, or possibly even both, to increase generator frequency to at least the minimum generator frequency setpoint. Following operation 214, or if operation 212 produces a "Yes" answer, at operation 216 the PWI subsystem 18 checks if the power walk-in time evaluated at the present generator frequency (i.e., the power walk-in time at the input of 18f in FIG. 2) meets, or is on track to meet, the maximum power walk-in time set by the user. If operation 216 returns a "No" answer, then at operation 218 the PWI subsystem 18 adjusts the minimum generator frequency setpoint to a new minimum generator frequency setpoint that will achieve the maximum power walk-in time. Operation 212 is then repeated at the new minimum generator frequency setpoint. When operation 216 produces a "Yes" answer, operation 204 is repeated. When the generator has assumed the full load of UPS 10, and operation 206 returns a "Yes" answer, the PWI subsystem 18 then checks for and accommodates UPS load changes at operations 208 and 210, comparable to operations 108 and 110 in the primary mode shown in flowchart 100 of FIG. 3.

The operations shown in FIG. 4 provide an opportunity for the generator frequency to recover to a point where it either 1) at least meets the user set minimum generator frequency setpoint, or 2) is reduced to a minimum level to place power walk-in time on track to occur within the user set maximum allowable time. It will be appreciated that operations 212-218 may also involve two or more rapid checks and adjustments of the frequency of the AC generator input signal to quickly reduce the input current or input power to the UPS 10 as needed to meet user set parameters during the power walk-in process. Thus, as in the primary mode, the PWI subsystem 18 continuously monitors generator frequency while the UPS 10 is running on generator.

The UPS 10 and its PWI subsystem 18 enable convenient and reliable control over the power walk-in process. If needed, the PWI subsystem 18 may even use the UPS 10 battery bank 12 to assist in powering the load(s) during the power walk-in process. The present system and method eliminates the guesswork associated with manually attempting to control the power walk-in process by manually estimating the loads. The present system and method also completely eliminates, or at least substantially reduces, the possibility of dropping a load during the power walk-in process, or creating a situation where the minimum frequency of the AC input signal drops suddenly to a point where the UPS suspends the power walk-in process, and is required to begin powering the load(s) using its battery bank. The present system and method further accomplishes control over the power walk-in process with a minimum of additional componentry and complexity, and does not necessitate significant re-design of existing UPS control systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for controlling power walk-in for an uninterruptible power supply (UPS) being switched to receive AC power from an AC generator, the system comprising:
 a control system; and
 a power walk-in (PWI) subsystem controlled in part by the control system, and including:
 the PWI subsystem configured to control at least one of an input current or an input power of an AC signal being provided by an AC generator during a power walk-in operation to attempt to maintain a minimum frequency of the AC signal from the AC generator during the power walk-in operation in which support of a load is gradually transitioned from AC power generated from a battery of the UPS, to being fully supported by the AC signal being generated by the AC generator.

2. The system of claim 1, wherein the PWI subsystem further comprises a user settable minimum generator frequency control for enabling a user to set the minimum frequency for the AC signal from the AC generator, which the frequency of the AC signal is not to drop below while the power walk-in operation is being carried out.

3. The system of claim 1, wherein the power walk-in subsystem is further configured to determine when the AC generator has assumed an entire amount of the load, and subsequently to continuously monitor the load for an increase in the load to a new load level, and when an increase is detected, to initiate an additional power walk-in operation.

4. The system of claim 1, wherein the PWI subsystem is configured to determine if the power walk-in operation can be carried out within a predetermined maximum power walk-in time period.

5. The system of claim 4, wherein the PWI subsystem further comprises a user settable maximum power walk-in time control for enabling a user to manually set the predetermined maximum power walk-in time period.

6. The system of claim 5, wherein the PWI subsystem is configured to detect when it will not be possible for the power walk-in operation to be carried out within the predetermined maximum power walk-in time period while maintaining the frequency of the AC signal being output from the AC generator at the minimum AC frequency.

7. The system of claim 5, wherein the PWI subsystem is further configured to allow the minimum generator frequency to be adjusted when the PWI subsystem has detected that the power walk-in operation will not be carried out within the predetermined maximum power walk-in time period.

8. An uninterruptible power supply (UPS) able to control a power walk-in operation when the UPS is being switched to receive AC power from an AC generator, the UPS comprising:
  a control system; and
  a power walk-in (PWI) subsystem controlled in part by the control system and configured to control at least one of an input current or an input power of an AC signal being provided by an AC generator during a power walk-in operation to either:
    at least attempt to maintain a minimum frequency of the AC signal from the AC generator during the power-walk-in operation; or
    ensure that the power walk-in operation occurs within a predetermined maximum power walk-in time period, wherein a load being handled by the UPS is gradually transitioned from AC power generated from a battery of the UPS to being fully supported by the AC signal being generated by the AC generator; and
  the PWI subsystem further including a user settable minimum generator frequency control for enabling a user to set a minimum value for the frequency of the AC signal from the AC generator, which the PWI subsystem attempts to maintain while the power walk-in operation is being carried out.

9. The UPS of claim 8, wherein the PWI subsystem further comprises a user settable maximum power walk-in time control for enabling a user to set a maximum time period within which the power walk-in operation must be carried out.

10. The UPS of claim 8, wherein the power walk-in subsystem is further configured to determine when the AC generator has assumed an entire amount of the load, and subsequently to continuously monitor the load for an increase in the load to a new load level, and when an increase is detected, to continue the power walk-in operation.

11. The UPS of claim 8, wherein the PWI subsystem is configured to detect when it will not be possible for the power walk-in operation to be carried out within the predetermined maximum power walk-in time period while maintaining the frequency of the AC signal being output from the AC generator at the minimum AC frequency.

12. The UPS of claim 11, wherein the PWI subsystem is further configured to allow the minimum generator frequency to be adjusted when the PWI subsystem has detected that the power walk-in operation will not be carried out within the maximum power walk-in time period.

13. A method for controlling power walk-in for an uninterruptible power supply (UPS) being switched to receive AC power from an AC generator, the method comprising:
  setting a minimum frequency which a frequency of an AC signal from the AC generator is not to drop below; and
  controlling at least one of an input current or an input power of the AC signal being provided by the AC generator during a power walk-in operation to ensure that a minimum frequency of the AC signal from the AC generator is maintained during the power walk-in operation, wherein support of a load is gradually transitioned from AC power generated from a battery of the UPS, to being fully supported by AC power being generated by the AC generator.

14. The method of claim 13, further comprising determining if the power walk-in operation can be carried out within a predetermined maximum power walk-in time period.

15. The method of claim 14, further comprising detecting when it will not be possible for the power walk-in operation to be carried out within the predetermined maximum power walk-in time period while maintaining the frequency of the AC signal being output from the AC generator at the minimum AC frequency.

16. The method of claim 15, further comprising allowing the minimum generator frequency to be adjusted when it is detected that the power walk-in operation will not be carried out within the predetermined maximum power walk-in time period, to ensure that the power walk-in operation can be carried out within the predetermined maximum power walk-in time period.

17. The method of claim 13, further comprising determining when the AC generator has assumed an entire amount of the load from the UPS, and subsequently continuously monitoring the load for an increase in the load to a new load level, and when an increase in a level of the load is detected, continuing the power walk-in operation.

18. The method of claim 14, wherein the predetermined maximum power walk-in time period comprises a user settable maximum power walk-in time period.

19. The method of claim 13, wherein the minimum frequency comprises a user settable minimum frequency.

* * * * *